US010981180B2

(12) United States Patent
Cella Mazzariol et al.

(10) Patent No.: US 10,981,180 B2
(45) Date of Patent: Apr. 20, 2021

(54) METHOD AND PLANT FOR PRODUCING SECONDARY SOLID FUEL

(71) Applicant: ENTSORGAFIN S.P.A., Tortona (IT)

(72) Inventors: Pietro Paolo Cella Mazzariol, Tortona (IT); Gian Francesco Galanzino, Tortona (IT)

(73) Assignee: Entsorgafin S.p.A., Tortona (IT)

( * ) Notice: Subject to any disclaimer, the term of this patent is extended or adjusted under 35 U.S.C. 154(b) by 0 days.

(21) Appl. No.: 16/646,429

(22) PCT Filed: Sep. 4, 2018

(86) PCT No.: PCT/IB2018/056740
§ 371 (c)(1),
(2) Date: Mar. 11, 2020

(87) PCT Pub. No.: WO2019/053551
PCT Pub. Date: Mar. 21, 2019

(65) Prior Publication Data
US 2020/0406269 A1    Dec. 31, 2020

(30) Foreign Application Priority Data

Sep. 13, 2017   (IT) .................. 102017000102613

(51) Int. Cl.
*C10L 5/36*     (2006.01)
*B03B 9/06*     (2006.01)
(Continued)

(52) U.S. Cl.
CPC .............. *B03B 9/061* (2013.01); *C10L 5/366* (2013.01); *C10L 5/46* (2013.01); *C10L 5/48* (2013.01);
(Continued)

(58) Field of Classification Search
CPC ... B03B 9/061; B03B 2009/068; C10L 5/366; C10L 5/46; C10L 5/48; C10L 2290/28; C10L 2290/546
See application file for complete search history.

(56) References Cited

U.S. PATENT DOCUMENTS 8,398,006 B2 *   3/2013   Gitschel .................... B07B 9/00
                                                          241/19

FOREIGN PATENT DOCUMENTS

| EP | 1431262 A1 | 6/2004 |
| JP | 2011-168694 A | 9/2011 |
| WO | 2012/071112 A1 | 5/2012 |

OTHER PUBLICATIONS

International Search Report and Written Opinion of the International Searching Authority dated Jan. 21, 2019 for International Patent Application No. PCT/IB2018/056740.

* cited by examiner

*Primary Examiner* — Cephia D Toomer
(74) *Attorney, Agent, or Firm* — Howson & Howson LLP

(57) ABSTRACT

A method and a plant for producing secondary solid fuel (SSF) provide for removing fine and heavy waste from a flow of treated waste and further subdividing the remaining waste into intermediate waste and light waste. Only the fraction of intermediate waste is subjected to removal of chlorinated plastics (PVC). Advantageously, thanks to the fact that only a small fraction of the treated waste is subjected to removal of the chlorinated plastics, high efficiency in the treatment of waste and in the production of SSF is obtained. Preferably, the intermediate waste fraction is also subjected to removal of ferrous metals and non-ferrous metals, such as aluminum.

13 Claims, 4 Drawing Sheets

(51) Int. Cl.
 *C10L 5/46* (2006.01)
 *C10L 5/48* (2006.01)
(52) U.S. Cl.
 CPC ..... *B03B 2009/068* (2013.01); *C10L 2290/28* (2013.01); *C10L 2290/546* (2013.01)

METHOD AND PLANT FOR PRODUCING SECONDARY SOLID FUEL

TECHNICAL FIELD

The present invention relates to a method for producing secondary solid fuel (SSF). The present invention also relates to a plant for producing secondary solid fuel (SSF) by implementing the aforesaid method.

PRIOR ART

Secondary solid fuel (SSF) is a type of fuel derived from processing non-hazardous waste. European regulations take this product into consideration and, more particularly, they define a quality classification of such product in EN 15359. Similarly, US regulations assign to such product the qualification of "Non-Hazardous Solid Materials (NHSM)", according to which the fuel can "lose" the status of waste and become a "commodity".

SSF can be obtained from different categories of waste, such as non-hazardous municipal solid waste (MSW) and non-hazardous commercial and industrial waste (C&I waste).

SSF can be used, for instance, in cement plants (the high residence times at high temperatures allow to completely destroy the polluting organic substances; heavy metals, if any, are bound in the ashes), incinerators (compared to those for disposal of MSW, incinerators using SSF have better thermal efficiency, smaller size and simplified abatement systems), thermoelectric power plants, lime production plants, steel plants, gasification plants, and so on.

In general, SSF is obtained from waste through a mechanical pre-treatment step and a biological treatment step, followed by a refining step aiming at eliminating undesired materials (such as, for example, ferrous and non-ferrous metals).

More particularly, the most suitable, though not the only, fractions of waste for producing SSF are mainly plastics, which are characterized by a reasonable calorific value.

As is known, the technical problem in preparing waste is connected with the heterogeneity of waste itself, i.e. to the need, on the one hand, to increase the calorific value of SSF by removing as much as possible the water contained therein, and, on the other hand, to remove those fractions that are not interesting for the aimed purpose (for example, those having a lower energy input or even entailing the risk of compromising the extensive use of SSF due to the potential negative side effects that they generate).

As far as the first problem is concerned, patent application EP 1431262 by the same inventors can be mentioned, in which application a system was defined for aerobic fermentation of waste and consequent reduction of water content, which system will not be disclosed in further detail herein.

Concerning the technical problem of selecting the waste matrices which are useful for the production of SSF (i.e. removing undesired waste matrices), both technical and patent literatures are very rich and include several documents illustrating selection apparatus and processes.

In detail, attention has to be paid to limiting chlorine (Cl) content in SSF, the presence of which would entail production of dioxins in the combustion fumes in case of low temperature combustors, while in the case of cement plants, where the production of dioxins is absent due to the high combustion temperatures, it rather gives rise to problems in terms of fluidity of the clinker, making it thick and sticky so that it could encrust the inner walls of the ducts of the plant, thus reducing the useful section thereof.

Chlorine in waste has both an organic and inorganic origin, the former essentially consisting of chlorinated plastics (namely, PVC) and the latter consisting of compounds such as NaCl (i.e. common cooking salt).

Therefore, methods and plants for treating waste for producing SFF are known which provide for one or more steps of removing undesired materials, such as ferrous and non-ferrous metals and chlorinated plastics (e.g. PVC).

As regards, in particular, the separation of PVC from treated waste, use of optical separators using NIR (Near Infra-Red) technology is known.

One of the problems connected to the use of NIR optical separators concerns the limited flow rates that these separators are able to handle: a NIR optical separator generally operates at a flow rate of about 7 t/h, much lower than the flow rates of the order of 35 t/h that can be reached at the outlet of the biological treatment step and, as a consequence, at the inlet of the mechanical refining step.

Therefore, the introduction of a NIR optical separator for removing chlorinated plastics in known waste treatment plants leads to a considerable slowing down of the process, i.e. to a significant loss of efficiency.

A possible solution could be provided by introducing several optical separators arranged in parallel, but it is also to be considered that these devices are expensive and very bulky, so that increasing the number of devices to be implemented on a refining line would lead to considerable inconveniences both in terms of increase in the costs for manufacturing the line and in terms of overall space occupied by the line itself.

The main object of the present invention is therefore to overcome the aforementioned drawbacks and limitations, by providing a method and a plant for producing secondary solid fuel (SSF) with improved efficiency.

Another object of the present invention is to provide a method and a plant for producing SSF which allow to produce a fuel having homogeneous characteristics conforming to the required specifications according to the particular needs connected with the final application.

These and other objects are achieved by a method and a plant as claimed in the appended claims.

SUMMARY OF THE INVENTION

Advantageously, the invention provides that only a small fraction of the waste coming out of the biological treatment step is subjected to the step of separating chlorinated plastics (e.g. PVC), so that the limited flow rate values that can be reached by NIR optical separators are not a prejudice to a high efficiency in waste treatment and SSF production.

As the Applicant has found that chlorinated plastics are essentially present only in waste having intermediate density (while they are substantially absent in fine, heavy and light waste), the method and the plant according to the invention provide for selecting said intermediate density waste and to subject only such intermediate density waste to the separation of chlorinated plastics, namely by means of a NIR optical separator.

More in detail, the method according to the invention provides for producing SSF by:
  a mechanical pre-treatment step;
  a biological treatment step; and
  a refining step;
  wherein said refining step comprises in turn:
  a sub-step of separating fine waste;

a sub-step of separating heavy waste;
a sub-step of separating the remaining waste into intermediate waste and light waste;
a sub-step of removing chlorinated plastics only from said previously separated intermediate waste;
a sub-step of mixing light waste and intermediate waste freed from chlorinated plastics;
a grinding sub-step.

In a preferred embodiment, the method according to the invention also comprises, during the refining step, a step of removing non-ferrous metals (in particular, aluminum).

In a particularly preferred embodiment of the invention, the intermediate waste fraction only is subjected to the step of removing non-ferrous metal.

In a preferred embodiment, the method according to the invention also comprises, during the refining step, one or more steps of removing ferrous metals.

Correspondingly, the SFF production plant according to the invention comprises:
a mechanical pre-treatment station;
a biological treatment station; and
a refining station;
wherein said refining station comprises in turn:
a device for separating fine waste, such as a rotating screen;
a first gravimetric separation device for separating heavy waste, such as for example a first aeraulic separator;
a second gravimetric separation device for separating the remaining waste into intermediate waste and light waste, such as for example a second aeraulic separator;
a device for removing chlorinated plastics, such as for example a NIR optical separator, which is arranged at the outlet of said second gravimetric separation device so as to receive at its inlet the intermediate waste only;
means for mixing light waste with intermediate waste freed from chlorinated plastics;
a grinding device.

In a preferred embodiment, the plant according to the invention also comprises, in the refining station, a device for removing non-ferrous metals (in particular aluminum), such as for example a parasitic current (eddy current) separator.

In a particularly preferred embodiment of the invention, the non-ferrous metal separation device is arranged in the refining station so as to receive at its inlet the intermediate waste only.

In a preferred embodiment, the plant according to the invention further comprises, in the refining step, one or more devices for removing ferrous metals, such as for example magnetic separators.

It is specified that in the context of the present invention:
"fine waste" means waste which can be separated by a screen with holes of 30 mm or less;
"heavy waste" means waste composed of materials with a density>40 t/m$^3$ (typically wood, bricks, stones, clumps of soil, metals, shoes, and the like)
"light waste" means waste having a density<35 t/m$^3$ and typically a two-dimensional shape (typically plastic films, dry leaves, paper sheets, cardboard, two-dimensional light cartons)
"intermediate waste" means waste that does not fall in the heavy and light waste categories (plastic pipes, three-dimensional plastic items, heavy cartons, three-dimensional light cartons).

BRIEF DESCRIPTION OF THE DRAWINGS

Further features and advantages will become clearer from the detailed description of some preferred embodiments of the invention, given by way of non-limiting example with reference to the attached drawings, in which.

DETAILED DESCRIPTION OF SOME PREFERRED EMBODIMENTS OF THE INVENTION

Figure 1A:
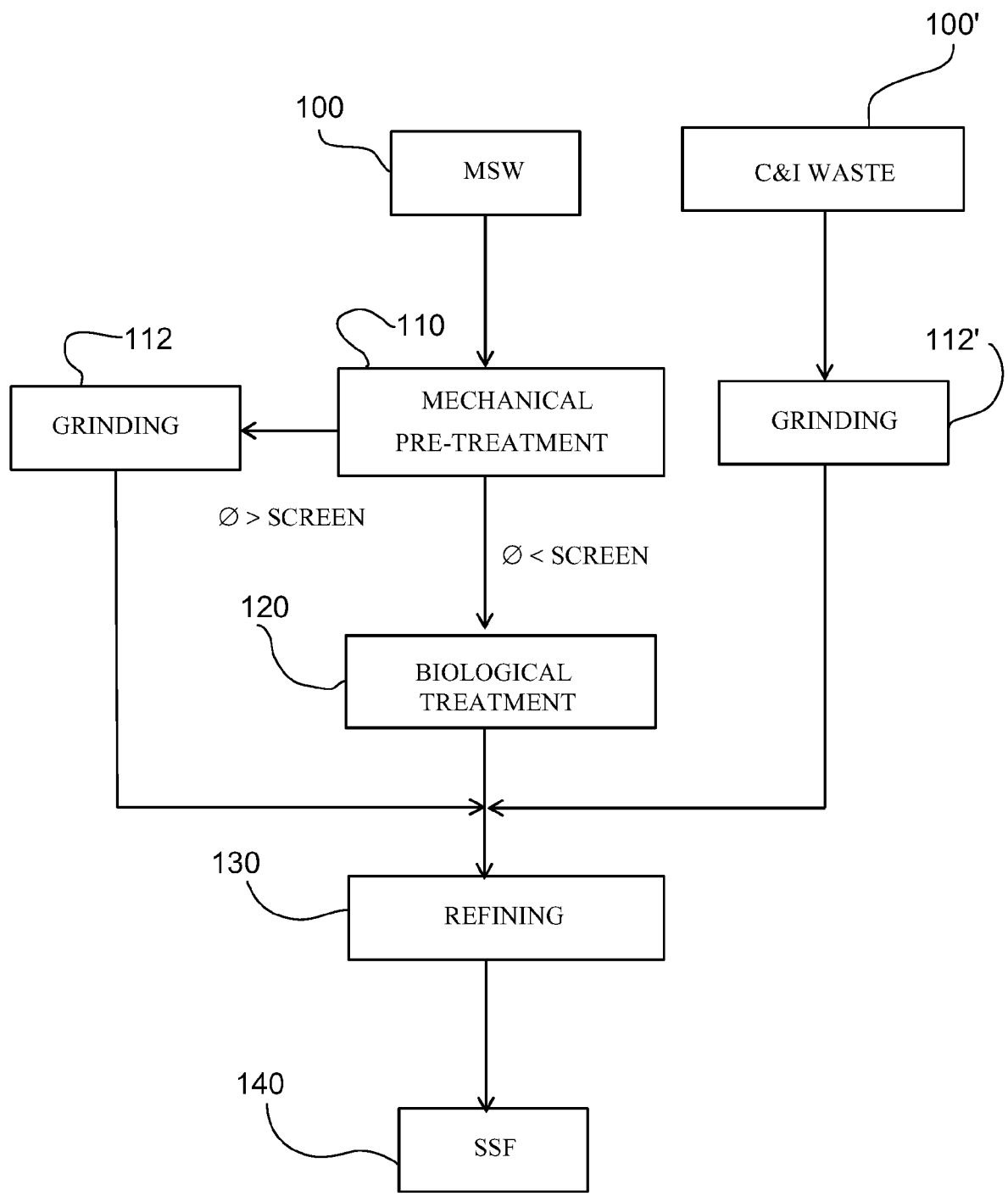
FIG. 1a is a flow chart schematically showing the main steps of the method according to the invention.

FIG. 1a is a flow chart schematically showing the main steps of the method according to the invention.

A first step 100 consists of a waste—in particular non-hazardous municipal solid waste—receiving step.

In this step, it is possible to provide for an inspecting sub-step, aimed at eliminating any hazardous waste erroneously received, as well as waste that is excessively bulky or otherwise unacceptable. Such unacceptable waste is collected and disposed of appropriately. In a second step 110, the waste is subjected to a mechanical pre-treatment step, which substantially comprises a sub-step of mechanically opening the bags and a sub-step of coarse screening, with a screen of 100-300 mm, preferably of about 200 mm.

Said mechanical pre-treatment step 110 allows to separate the waste having a size larger than the coarse screen size from those having a size smaller than said coarse screen size.

Waste having a size larger than the coarse screen size usually consists of biologically inactive waste (non-recyclable plastics, wood, cardboard, textiles).

Said waste is therefore subjected to a primary grinding sub-step 112 and directly sent to subsequent refining without being subjected to any biological treatment step.

On the other hand, in a third step 120, waste having a size smaller than said coarse screen size is subjected to a biological treatment step.

Said biological treatment step 120 is preferably a bio-drying step, during which the waste is stabilized and dried (for example up to a homogeneous water content of about 20-25%).

This biological treatment step can be carried out, for example, according to the teachings of European patent application EP 1431262 A1 in the name of the Applicant.

In a preferred embodiment of the invention, a further step of receiving commercial and industrial waste (C&I waste) 100' is also provided.

Said waste of commercial and industrial origin is mainly composed of non-recyclable rubber and plastic materials and is substantially biologically inactive. Therefore it is not subjected to any biological treatment and it is subjected to a primary grinding phase 112' and then directly addressed to subsequent refining.

In a fourth step 130 of the method according to the invention, the waste coming from the biological treatment step 120 (together with the biologically inactive ground waste and the commercial and industrial waste) is subjected to a refining step.

Said refining step 130 will be described in detail below. It aims to remove materials that do not have good calorific value, and in particular metals. It also has the purpose of removing materials containing chlorine, and in particular chlorinated plastics, since their combustion would generate dioxins.

At the end of this refining step 130, a secondary solid fuel (SSF) is obtained (step 140), which fuel can be pressed and packaged for storage and subsequent use.

Figure 1B:
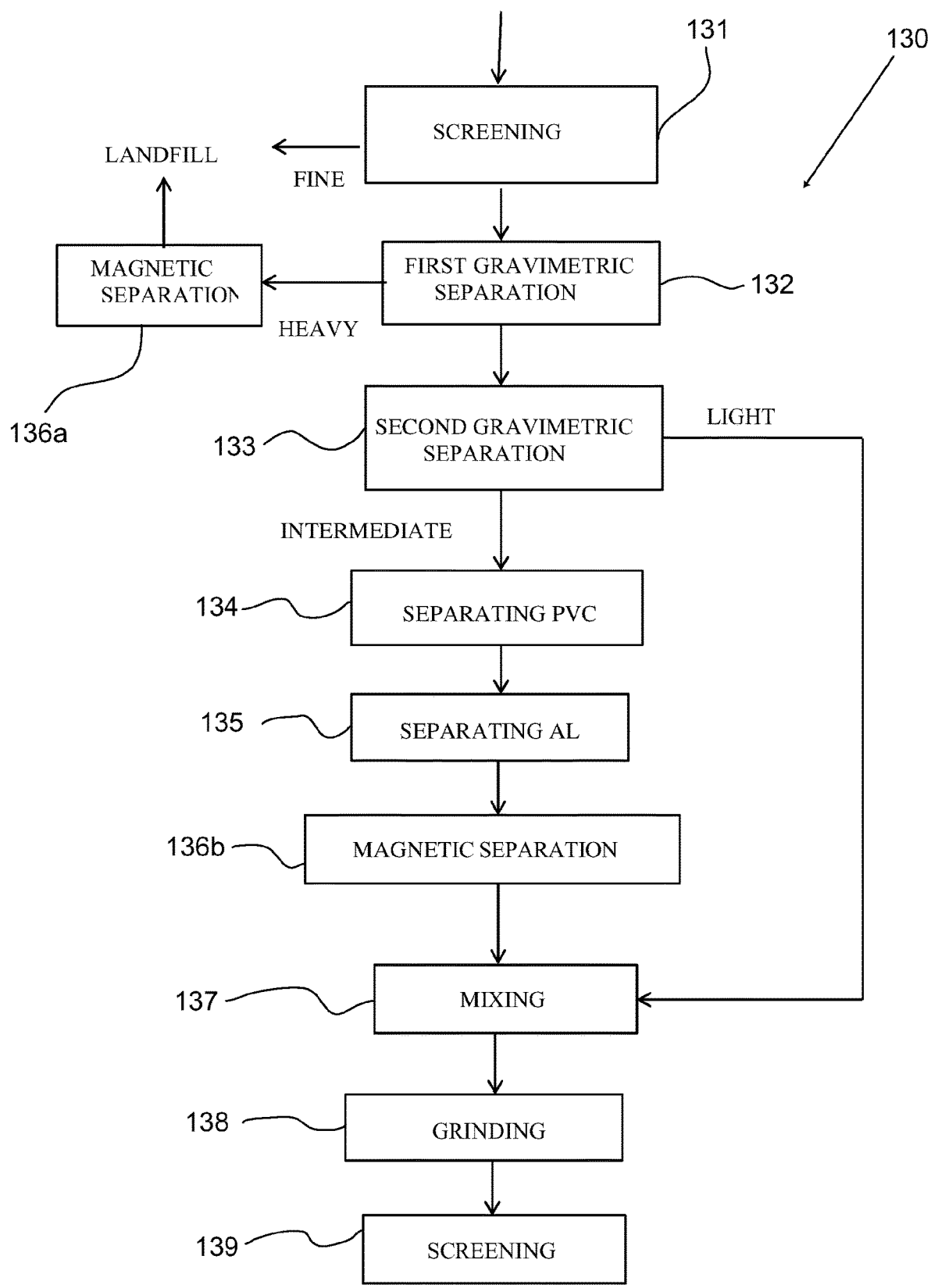
FIG. 1b is a flow chart schematically showing the main steps of the refining step of the method according to the invention.

FIG. 1b shows in detail the refining step 130 of the method according to the invention, in the form of a flow chart showing the main sub-steps of said refining step.

At first, said refining step 130 provides for a screening sub-step 131 for separating fine waste, i.e. the waste which can be separated by a screen with holes of 30 mm or less.

Such fine waste is removed from the flow of treated waste and sent to a landfill.

The remaining waste is subjected to a first gravimetric separation sub-step 132 for separating heavy waste, i.e. waste having a density>40 t/m$^3$ (typically wood, bricks, stones, clumps of soil, metals, shoes, and the like).

This heavy waste, too, is removed from the flow of treated waste and sent to a landfill.

Preferably, before being sent to the landfill, said heavy waste is subjected to a sub-step of removing ferrous metals 136a, for example by magnetic means.

Advantageously, according to the invention, the remaining waste is further separated by a second gravimetric separation sub-step 133, which allows to separate waste into light waste, i.e. waste having a density<35 t/m$^3$ and typically a two-dimensional shape (typically plastic films, dry leaves, paper sheets, cardboard, two-dimensional light cartons) and intermediate waste, which does not fall in the categories of heavy and light waste (such as, plastic pipes, three-dimensional plastic items, heavy cartons, three-dimensional light cartons).

The provision of said second gravimetric separation sub-step 133 allows to considerably increase the efficiency of the method for producing SSF.

In fact, chlorinated plastics (for example PVC), which are undesirable due to the formation of dioxins in the event of combustion and which, therefore, must be removed, are predominantly present in the intermediate waste fraction, while they are substantially absent in the light waste fraction.

Accordingly, in a subsequent sub-step 134 of the method according to the invention, only the fraction of the intermediate waste is advantageously subjected to a treatment for separating chlorinated plastics.

Said sub-step of separating chlorinated plastics 134 is preferably carried out by using the NIR (Near Infra-Red) technology. This technology is known per se and therefore it will not be illustrated in detail herein.

It will be evident to the person skilled in the art that, on the one hand, NIR optical separators are able to handle only limited flow rates (of the order of 7 t/h), and that, on the other hand, such limitation is thoroughly compensated by the fact that only a limited fraction of the treated waste is sent to the NIR optical separator.

In a preferred embodiment of the method according to the invention, a sub-step of separating non-ferrous metals 135, in particular aluminum, is also provided.

The provision of this sub-step is advantageous due to the fact that aluminum is a high quality recyclable waste, and it is therefore advisable to separate it so that it can be treated separately.

Aluminum, too, is substantially present in the intermediate waste fraction only while it is substantially absent in the light waste fraction.

Therefore, only the fraction of the intermediate waste is advantageously subjected to the sub-step of removing non-ferrous metals 135.

Said sub-step of removing non-ferrous metals 135 can be carried out, for example, by means of the eddy currents technology. This technology is known per se and therefore it will not be illustrated in detail herein.

In a preferred embodiment of the invention, the intermediate waste fraction is further subjected to a sub-step of removing ferrous metals 136b, for example by magnetic means. Also in this case, only the fraction of the intermediate waste is subjected to the sub-step of removing ferrous metals 136b, since said ferrous metals are substantially absent in the light waste fraction.

In a subsequent sub-step 137 of the method according to the invention, the intermediate waste thus freed from the undesired components (chlorinated plastics and ferrous and non-ferrous metals) are mixed back with the light waste.

The flow of waste thus obtained is subjected to a secondary grinding sub-step 138 and final screening 139, at the end of which the desired SSF is obtained.

Figure 2A:
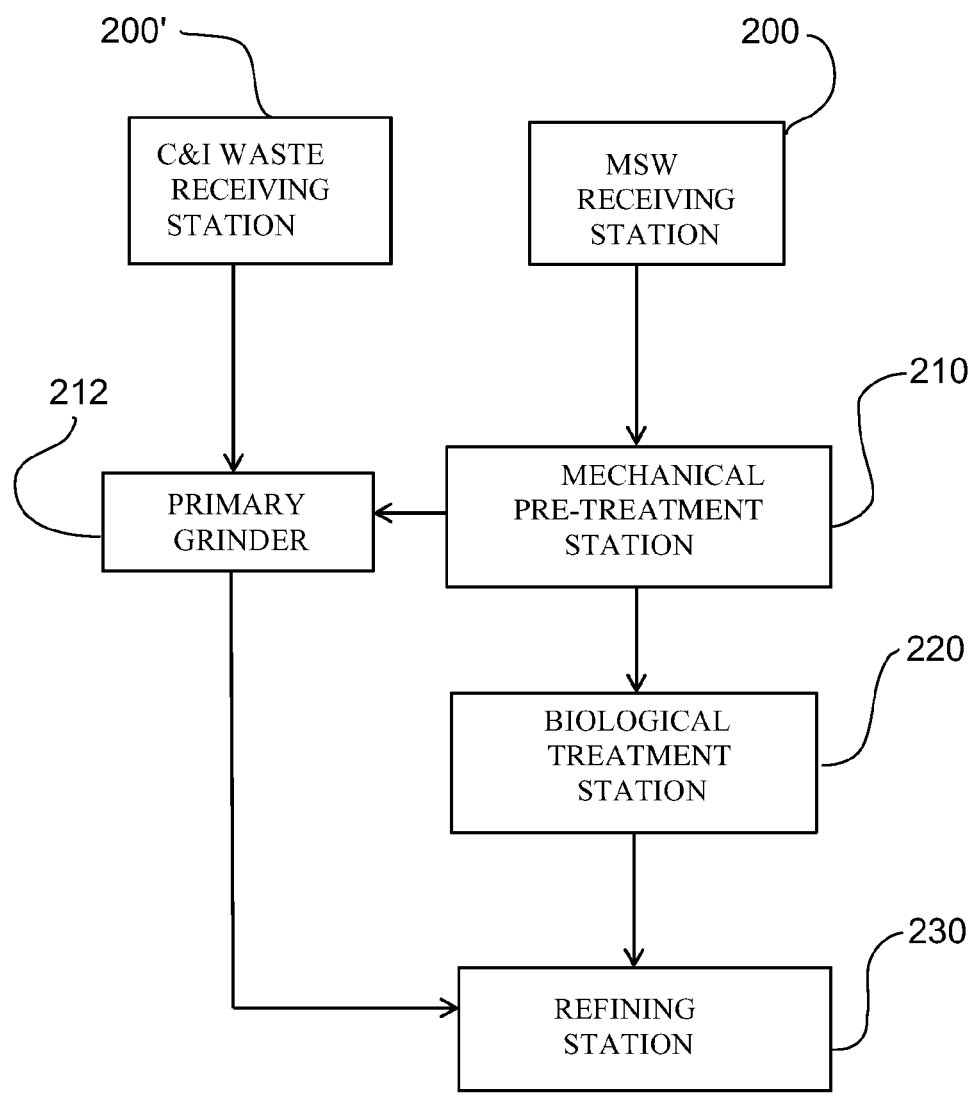
FIG. 2a is a block diagram schematically showing the main stations of the plant according to the invention.
Figure 2B:
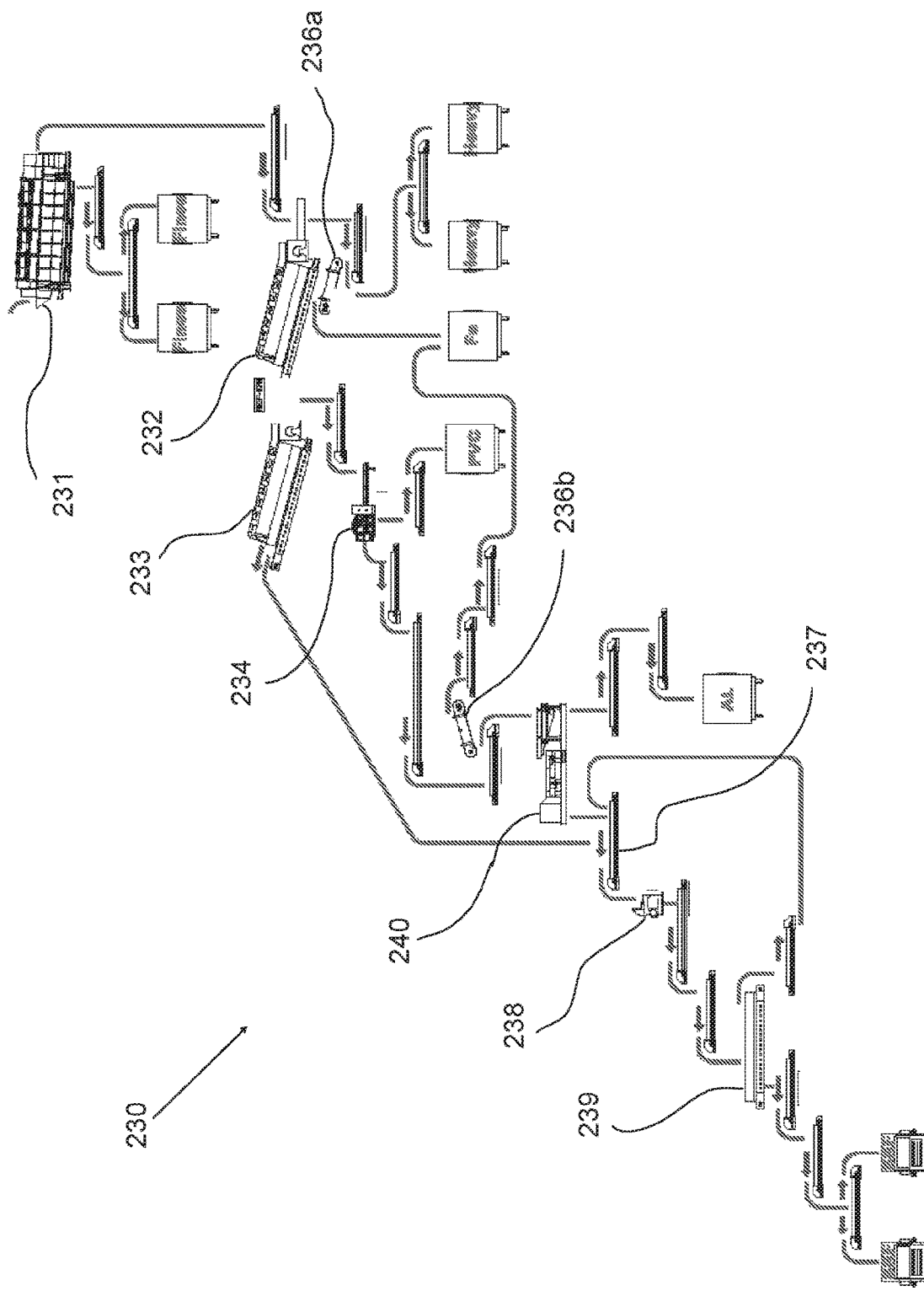
FIG. 2b is a block diagram schematically showing the main components of the refining station of the plant according to the invention.

Turning now to FIGS. 2a and 2b, a plant according to the invention is schematically shown, which plant is capable of implementing the method described above.

With reference initially to FIG. 2a, the plant according to the invention comprises a station for receiving waste 200— in particular non-hazardous municipal solid waste.

Said station 200 may comprise means for inspecting the received waste in order to identify any hazardous waste erroneously received, as well as waste that is excessively bulky or otherwise unacceptable, and means for picking such unacceptable waste, such as for example a bridge crane.

The plant according to the invention further comprises a station for mechanical pre-treatment 210, which may comprise means for mechanically opening the bags and a screen having a size of 100-300 mm, preferably of about 200 mm.

Waste having a size larger than the screen size usually consists of biologically inactive waste. Said waste bypasses the following station of biological treatment and is sent to a primary grinder 212 and then directly to the refining station.

On the other hand, waste having a size smaller than the coarse screen size is sent to a station for biologically treatment 220, preferably a bio-drying station.

Said station for biological treatment 220 may be made, for example, according to the teachings of the European patent application EP 1431262 A1 in the name of the Applicant. In a preferred embodiment of the invention, the plant provides for a further receiving station 200' for receiving commercial and industrial waste (C&I waste).

Said waste of commercial and industrial origin is mainly composed of non-recyclable rubber and plastic materials and it is substantially biologically inactive. Therefore, it is not subjected to any biological treatment; on the contrary, it is sent to the primary grinder 212 (or to a primary grinder dedicated thereto) and, from there, directly sent to the refining station.

The refining station 230 therefore receives the waste coming from the biological treatment station 220 and the biologically inactive waste coming from the primary grinder 212.

Said refining station 230 is shown in greater detail in FIG. 2b.

Firstly, said refining station 230 comprises a drum screen 231 for separating fine waste.

Such fine waste is removed from the flow of treated waste and sent to a landfill.

The remaining waste is sent to a first gravimetric separation device 232, in particular a first aeraulic separator, which is designed for separating heavy waste.

This heavy waste, too, is removed from the flow of treated waste and sent to a landfill.

Preferably, before being sent to the landfill, said heavy waste is passed through a magnetic separator 236a, such as for example a magnetic conveyor belt for removing ferrous metals. Advantageously, the plant according to the invention further comprises a second gravimetric separation device 233, in particular a second aeraulic separator, which allows to further separate the remaining waste into intermediate waste and light waste.

Downstream of said second gravimetric separation device 233, a device for separating chlorinated plastics (for example PVC) 234 is provided, which device is arranged so as to receive at its inlet said fraction of intermediate waste only.

Said device for separating chlorinated plastics can be, for example, a optical separator NIR 234. This separator is known per se and therefore it will not be illustrated in detail herein.

In a preferred embodiment of the invention, the plant also comprises a non-ferrous metal removal device 235, designed in particular to separate aluminum.

Preferably, also said non-ferrous metal removing device 235 is arranged so as to receive at its inlet the fraction of intermediate waste only.

Said non-ferrous metal removing device may be, for example, a parasitic current separator 235. This separator is known per se and therefore it will not be shown in detail herein.

In a preferred embodiment of the invention, the plant further comprises a magnetic separator 236b, which is also arranged so as to receive at its inlet the fraction of the intermediate waste only and is intended to separate the ferrous metals.

The plant according to the invention further comprises means 237 for mixing back the intermediate waste (freed from the undesired components) with the light waste.

The waste flow thus obtained is sent to a secondary grinder 238 and from there to a disc screen 239, at the output of which the desired SSF is obtained.

It will be evident to the person skilled in the art from the above that the method and the plant according to the invention allow to achieve the objects set forth above, since they allow to optimize the treatment of waste for obtaining a secondary solid fuel having the desired characteristics.

It will also be evident that the embodiment described above has been provided purely by way of non-limiting example and that numerous variations and modifications are possible without departing from the scope of protection as defined by the appended claims.

The invention claimed is:

1. A method for producing secondary solid fuel (SSF) starting from waste, the method comprising:
    receiving the waste;
    mechanically pretreating the waste;
    biologically treating the waste; and
    refining the waste;
    wherein refining the waste comprises:
    separating and removing fine waste;
    carrying out a first gravimetric separation for separating and removing heavy waste;
    carrying out a second gravimetric separation for separating the remaining waste into an intermediate waste fraction and a light waste fraction;
    separating chlorinated plastic materials from the intermediate waste fraction only;
    after having separated chlorinated plastic materials, mixing the intermediate waste fraction with the light waste fraction.

2. The method according to claim 1, wherein refining the waste further comprises, after having mixed the intermediate waste fraction with the light waste fraction, grinding and screening the resulting fraction of mixed intermediate and the light waste fractions.

3. The method according to claim 1, wherein refining the waste further comprises removing non-ferrous metals.

4. The method according to claim 3, wherein only the intermediate waste fraction is subjected to removal of non-ferrous metals.

5. The method according to claim 1, wherein refining the waste further comprises removing ferrous metals.

6. A plant for producing secondary solid fuel (SSF) starting from waste, the plant comprising:
    a station for receiving the waste;
    a station for mechanically pretreating the waste;
    a station for biologically treating the waste; and
    a station for refining the waste;
    wherein the refining station comprises:
    a rotating screen for separating fine waste;
    a first gravimetric separation device for separating and removing heavy waste;
    a second gravimetric separation device for separating the remaining waste into an intermediate waste fraction and a light waste fraction;
    a device for separating chlorinated plastic materials, which is provided downstream of the second gravimetric separation device and arranged so as to receive at its inlet the intermediate waste fraction only;
    a mixing device, arranged downstream of the device for separating chlorinated plastic materials, for mixing the intermediate waste fraction with the light waste fraction.

7. The plant according to claim 6, wherein the refining station further comprises, downstream of the mixing device for mixing the intermediate waste fraction with the light waste fraction, a grinder and a screen.

8. The plant according to claim 6, wherein the refining station further comprises a device for removing non-ferrous metals.

9. The plant according to claim 8, wherein the device for removing non-ferrous metals is provided downstream of the second gravimetric separation device and arranged so as to receive at its inlet the intermediate waste fraction only.

10. The plant according to claim 6, wherein the refining station further comprises one or more magnetic separators for removing ferrous metals.

11. The plant according to claim 6, wherein the first and second gravimetric separation devices are aeraulic separators.

12. The plant according to claim 6, wherein the device for separating chlorinated plastic materials is a NIR optical separator.

13. The plant according to claim 8, wherein the device for removing non-ferrous metals is an eddy current separator (235).

* * * * *